United States Patent [19]

Binsack et al.

[11] 4,140,730
[45] Feb. 20, 1979

[54] POLYCARBONATE FILM

[75] Inventors: Rudolph Binsack; Manfred Grundmeier, both of Krefeld; Eckart Reese, Dormagen; Hugo Vernaleken, Krefeld-Bockum, all of Fed. Rep. of Germany

[73] Assignee: Bayer Aktiengesellschaft, Leverkusen, Fed. Rep. of Germany

[21] Appl. No.: 918,996

[22] Filed: Jun. 26, 1978

Related U.S. Application Data

[63] Continuation of Ser. No. 611,452, Sep. 8, 1975, which is a continuation-in-part of Ser. No. 516,569, Oct. 21, 1974, abandoned.

[30] Foreign Application Priority Data

Oct. 31, 1973 [DE] Fed. Rep. of Germany ....... 2354533

[51] Int. Cl.$^2$ .............................................. C08L 67/00
[52] U.S. Cl. .............................. 260/860; 260/45.95 R
[58] Field of Search .......................................... 260/860

[56] References Cited

U.S. PATENT DOCUMENTS

| | | | |
|---|---|---|---|
| 3,038,874 | 6/1962 | Laakso | 260/860 |
| 3,119,787 | 1/1964 | Laakso | 260/860 |
| 3,166,606 | 1/1965 | Reinking et al. | 260/860 |
| 3,287,442 | 11/1966 | Caldwell | 260/860 |
| 3,290,409 | 12/1966 | Munro | 260/860 |
| 3,647,747 | 3/1972 | Bialous | 260/860 |
| 3,748,303 | 7/1973 | Becker | 260/860 |
| 3,751,400 | 8/1973 | Crennan et al. | 260/47 X A |
| 3,786,114 | 1/1974 | Jaquiss | 260/860 |
| 3,796,772 | 3/1974 | Luce | 260/860 |
| 3,833,685 | 9/1974 | Wambach | 260/860 |
| 3,852,238 | 12/1974 | Luce | 260/860 |
| 3,855,277 | 12/1974 | Fox | 260/45.7 R |
| 3,890,266 | 6/1975 | Serini | 260/37 PC |
| 3,912,687 | 10/1975 | Haupt | 260/47 X A |
| 3,915,926 | 10/1975 | Wambach | 260/40 R |

FOREIGN PATENT DOCUMENTS

| | | | |
|---|---|---|---|
| 725726 | 1/1966 | Canada | 260/860 |
| 4142272 | 10/1972 | Japan. | |
| 4453772 | 11/1972 | Japan. | |
| 938124 | 10/1963 | United Kingdom | 260/860 |

OTHER PUBLICATIONS

Polycarbonates, Christopher et al., (Reinhold, 1962) pp. 39-45, 151.

*Primary Examiner*—Thomas De Benedictis, Sr.
*Attorney, Agent, or Firm*—Gene Harsh; Lawrence S. Pope

[57] ABSTRACT

A polycarbonate film having improved flame resistance and good stress-corrosion-cracking resistance is prepared from a solution of a mixture of a low molecular weight polycarbonate containing at least about 5% by weight halogen and a higher molecular weight polycarbonate prepared from bisphenol containing at least 90 mol percent bisphenol A. The novel film can be used to advantage for self-supporting electrical insulating films.

7 Claims, No Drawings

POLYCARBONATE FILM

This is a continuation, of application Ser. No. 611,452 filed 9-8-75, which itself is a continuation-in-part of our application Ser. No. 516,569, filed Oct. 21, 1974, now abandoned.

This invention relates generally to aromatic polycarbonate plastics and more particularly to a novel high quality cast polycarbonate plastic film.

It has been disclosed that high molecular weight aromatic polycarbonates based on bis-(hydroxyphenyl)-alkanes, especially 2,2-bis-(4-hydroxyphenyl)-propane (bisphenol A), can be converted into films which are adapted to be used as electrical insulating film in the electrical industry (DT-PS 971,790; Angew. Chem. 74, 1962, pages 647 to 650).

Such films are as a rule prepared from solutions of the polycarbonate by casting. However, they can also be obtained by extrusion through slit dies. If such films are exposed to organic non-solvents, for example, carbon tetrachloride, their mechanical properties can be impaired greatly, especially if the films are exposed to stresses while such non-solvents are acting on them. This can even go so far that after a relatively short time the films lose their mechanical strength and break. This property is known to those skilled in the art as "stress-corrosion-cracking".

Since, components insulated with a plastic film may come into contact with non-solvents, for example to remove remnants of fat and oil therefrom, it is only possible to use electrical insulating films which have as little tendency to stress-corrosion-cracking as possible.

As the viscosity of the polycarbonates increases, the films prepared therefrom show a reduced tendency to stress corrosion cracking. At a relative viscosity of 1.70 (0.5 g in 100 ml of methylene chloride solution), corresponding to an average molecular weight of about 70,000, the tendency to stress corrosion cracking is so low that there is no longer any impairment of the usability of the films.

However, a disadvantage of this film is its inflammability. This can, inter alia, have a very adverse effect in the case of components exposed to severe temperature conditions, such as, for example, line transformers of color television sets.

It is known that the inflammability of normally processable high molecular weight polycarbonates, for example polycarbonates for injection molding, can be lowered by mixing the polycarbonate with substances containing halogen, such as halogenated aromatics, especially diphenylene, halogenated norbornane derivatives and others, if appropriate with simultaneous addition of metal salts, phosphorus compounds and other substances [see, for example, DOS (German Published Specification Nos. 2,013,496; 2,122,300; 2,153,101 and 2,243,226 U.S. Pat. No. 3,357,942 and French Pat. No. 1,439,030]. When such substances are used to lower the inflammability of polycarbonate films, the latter lose their good mechanical properties and in particular the tendency to stress-corrosion-cracking is greatly increased by these substances.

Another way of reducing the inflammability of a high molecular weight polycarbonate is to use bisphenols containing halogen, such as, for example, tetrachloro- and tetrabromo-bisphenol as co-condensable monomers in making the polycarbonate. However, this process, which has found successful acceptance for thermoplastic polycarbonates for moldings, cannot be used for making polycarbonate films. In order to guarantee sufficient flame-resistance with thin layers of polycarbonate, such a high proportion of the bisphenols containing halogen has to be cocondensed in making the polycarbonate that the mechanical properties of the high molecular polycarbonates, especially the stress crack resistance which is reduced thereby, no longer suffice for use in films.

It is therefore an object of this invention to provide cast polycarbonate films having improved flame-resistance and resistance to stress-corrosion-cracking. Another object of the invention is to provide cast polycarbonate films which are substantially flame-resistant and have mechanical properties which adapt them for use as electrical insulators. A further object of the invention is to provide a method for imparting flame-resistance to a polycarbonate film without seriously affecting the electrical and mechanical properties such as stress-corrosion-cracking resistance of the film.

The foregoing objects and others are accomplished in accordance with this invention, generally speaking, by providing a polycarbonate film cast from a solution containing a low molecular weight polycarbonate prepared from a halogeno-bisphenol and a high molecular weight polycarbonate prepared from bisphenol A.

It has now been found, surprisingly, that by addition of low molecular weight halogeno-bisphenol-polycarbonates to high molecular bisphenol-A-homopolycarbonates or copolycarbonates the inflammability of the cast films prepared therefrom can be greatly reduced without deterioration of the good mechanical, electrical and aging properties required for an electrical insulating film. In particular, it is surprising that the tendency to stress-corrosion-cracking is not increased although the added halogeno-bisphenol-polycarbonates are themselves of such low-molecular weight that by themselves they are not film-forming.

The present invention therefore provides high quality cast polycarbonate films of low inflammability, having an oxygen index of $\geq 26\%$, measured at a layer thickness of 0.1 mm, and having a total halogen content of $\geq 5\%$ by weight, and consisting of from about 10% to about 30% by weight of a low molecular weight polycarbonate based on halogeno-bisphenols and from about 90% to about 70% by weight of a halogen free high molecular weight homopolycarbonate or copolycarbonate based on bisphenol A.

Suitable low molecular weight halogeno-bisphenol-polycarbonates with molecular weights of $\overline{M}n$ = approx. 8000–20,000 are the homopolycarbonates or copolycarbonates obtained from the halogenated bisphenols of the following formula

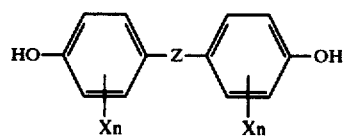

wherein X is Cl or Br, n is 1, 2, 3 or 4 and Z is $C_1$-$C_8$-alkylene, $C_2$-$C_8$-alkylidene, $C_5$-$C_{12}$-cycloalkylene, $C_5$-$C_{12}$-cycloalkylidene or the following radical

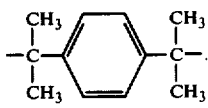

Suitable examples for the halogeno-bisphenols are bis-(3.5-dibromo-4-hydroxyphenyl)-methane, 2.2-bis-(3-bromo-4-hydroxyphenyl)-propane, 2.4-bis-(3-bromo-4-hydroxyphenyl)-2-methylbutane, 2.4-bis-(3.5-dichloro-4-hydroxyphenyl)-2-methylbutane, 2.4-bis-(3.5-dibromo-4-hydroxyphenyl)-2-methylbutane, 1.1-bis-(3-bromo-4-hydroxyphenyl)-cyclohexane, 1.1-bis-(3.5-dichloro-4-hydroxyphenyl)-cyclohexane, 1.1-bis-(3.5-dibromo-4-hydroxyphenyl)-cyclohexane, α,α'-bis-(3.5-dibromo-4-hydroxyphenyl)-p-diisopropylbenzene and α,α'-bis-(3.5-dichloro-4-hydroxyphenyl)-p-diisopropylbenzene. Preferred examples of the halogeno-bisphenols are 2.2-bis-(3.5-dibromo-4-hydroxyphenyl)-propane (Tetrabrombisphenol-A) and 2.2-bis-(3.5-dichloro-4-hydroxyphenyl)-propane (Tetrachlorobisphenol-A).

Preferred low molecular weight halogeno-bisphenol-polycarbonates are the tetrachloro- and tetrabromo-bisphenol-A-polycarbonates.

A preferred molecular weight range for the low molecular weight halogeno-bisphenol-polycarbonates is between 8,000 and 12,000. When using polycarbonates in the molecular weight range of 8000–12,000 as an additive to high molecular polycarbonates, a marked rise in the heat resistance of cast polycarbonate films prepared therefrom is observed in addition, this being surprising for high molecular polycarbonates in view of such low molecular admixtures. The molecular weight of the halogeno-bisphenol-polycarbonates may be limited in a known manner by using a monophenol as a chain stopper. Examples of suitable monophenols are alkylphenols, such as the methylphenols, the ethylphenols, the propylphenols and the isopropylphenols, the butylphenols and unsubstituted phenol; halogenophenols, especially 2,4,6-trichlorophenol and 2,4,6-tribromophenol, are also suitable.

Any suitable high molecular weight ($\overline{M}_w$ between 30,000 and 200,000) polycarbonate based on bisphenol A can be used for the preparation of the films according to the invention. The polycarbonate can be prepared from a mixture of bisphenols which contain up to 10 mol %, based on the total bisphenol content of other bisphenols, and/or up to 0.5 mol %, based on bisphenol A, of branching components such as trisphenols or tetraphenols. Preferably, high molecular weight copolycarbonates based on 99–90 mol % bisphenol A (2,2-bis-(4-hydroxyphenyl)-propane) and 1–10 mol % of 1,1-bis-(4-hydroxyphenyl)-cyclohexane, with molecular weights $\overline{M}_w$ between 70,000 and 120,000, are used.

Other bisphenols which can be used for the preparation of the high molecular weight copolycarbonates are the dihydroxydiarylcycloalkanes and also dihydroxydiarylalkanes, such as for example, bisphenol F (bis-(4-hydroxyphenyl)-methane) and tetramethylbisphenol A (2,2-bis-(3,5-dimethyl-4-hydroxyphenyl)-propane).

These polycarbonates, when mixed with the above-mentioned low molecular weight halogen-containing polycarbonates, prove particularly advantageous from the point of view of a reduced tendency to crystallization. This effect is of decisive importance particularly for cast films since even a slight crystallization of the polycarbonate composition gives unusable films which are prone to stress-corrosion-cracking.

Both the low molecular weight halogen-containing and the high molecular weight aromatic polycarbonates are prepared according to customary processes known to those skilled in the art, such as, for example, according to the phase boundary process. A suitable process is disclosed in U.S. Pat. No. 3,028,365, the disclosure of which is incorporated herein by reference.

The cast films are prepared according to known film forming techniques, for example by conjointly dissolving the components of the mixture in a suitable solvent for polycarbonate, such as methylene chloride, 1,2-dichloroethane or chloroform, to give 5–20% strength solutions, which are cast on belt casting machines or drum casting machines. Any suitable solvent for the polycarbonates may be used.

The term "of low inflammability" is here used in the sense that the inflammability of the films is much less than that of comparative control samples. A suitable direct measurement of the inflammability is the oxygen index test. In this test, the inflammability of a product is measured on the basis of the oxygen content of the combustion atmosphere. Suitable samples are placed in a combustion chimney and the oxygen content is reduced in steps until the material no longer burns with a flame. The oxygen index is defined as the oxygen content in percent, relative to the sum of the percentage proportions of nitrogen and oxygen in the gas used for the combustion of the material to be tested.

The films are tested by a method based on ASTM test method D 2863-70. The samples used are strips of film of size 50 × 150 mm and of 0.1 mm thickness, which are clamped vertically and ignited at the upper edge. The films according to the invention, which contain the halogen-containing low molecular polycarbonates which impart low inflammability, have a substantially higher oxygen index and are therefore much less inflammable than the comparison samples. As set forth hereinbefore, the oxygen index of the film provided by the invention is 26% or greater than 25%.

Another method which can be used to measure the flame repellency is the small burner test according to DIN 53,438, provisional standard specification. With the film vertical, either the edges or the surfaces are exposed to the flame and the results are classified under three classes (K1 to K3 (edge treatment) and F1 to F3 (surface treatment) respectively. The polycarbonate films of low inflammability, according to the invention, at a thickness of 0.1 mm give the best possible rating in this test, namely K1/F1, which is regarded as the condition for being rated as "of low inflammability".

The small burner test (according to DIN 53,438) is performed as follows:

A test specimen vertically clamped in a frame, is subjected to a 20 mm high propane gas flame from a Bunsen burner (burner tube $\phi$ 4 mm) for 15 seconds; in process k the flame is applied to the free edge at the bottom and in process F to the area within the lower part of the surface. The size of the test specimen K is 110 mm × 90 mm and that of the test specimen F 230 mm × 90 mm. The evaluation in accordance with DIN 53,438 is done in three classes: K1, K2, K3 and F1, F2, F3, whilst indicating the thickness of the test specimen.

Class 1: the flame extinguishes before reaching the measuring mark;

Class 2: the tip of the flame reaches the measuring mark after more than 20 seconds;

Class 3: the tip of the flame reaches the measuring mark after less than 20 seconds.

The composition of the films and some of their properties are listed in Table 1 which follows.

TABLE 1

| EXAMPLE | 1 | 2 | 3 | 4 | 5 |
|---|---|---|---|---|---|
| Polycarbonate a) (parts by weight) | 100 | — | 87 | 83 | 74 |
| Polycarbonate b) (parts by weight) | — | 90 | — | — | — |
| Polycarbonate c) (parts by weight) | — | 10 | 13 | 17 | — |
| Polycarbonate d) (parts by weight) | — | — | — | — | 26 |
| O₂ index, %, 0.1 mm film thickness | 21.0 | 26.0 | 27.0 | 31.0 | 29.0 |
| Small burner test, DIN 53,438, 0.1 mm thickness | K 3/F3 | K 1/F1 | K 1/F1 | K 1/F1 | K 1/F1 |
| E-modulus[1], kp/cm² | 20,700 | 22,400 | 22,700 | 23,700 | 23,900 |
| Tensile strength[1], MPa | 85 | 84.5 | 84 | 85 | 82 |
| Elongation at break[1], % | 125 | 119 | 118 | 120 | 111 |
| Elongation at break[2] after 10 seconds storage in toluene/n-propanol | | | | | |
| 1:3.5 | 122 | 117 | 118 | 120 | 109 |
| 1:3 | 125 | 114 | 117 | 120 | 108 |
| Dielectric constant $\epsilon_r$ (20° C/50 Hz) | 3.0 | 2.9 | 3.0 | 3.0 | 2.85 |
| Dielectric loss factor tanδ.10⁴ (20°/50 Hz) | 13 | 14 | 13 | 13 | 14 |
| Electrolytic corrosion, DIN 53,489 | A 1 | A 1 | A 1 | A 1 | A 1 |
| Resistance to continuous heat, according to VDE 0304 | 135° C. | 133° C. | 134° C. | 134° C. | 130° C. |

Notes on Table 1
[1] from the tensile test accordinng to DIN 53,455
[2] to measure the stress-corrosion-cracking, 15 mm wide test strips of the films were spirally wound around a glass rod of 8 mm diameter and then stored for 10 seconds in toluene/n-propanol mixtures. After drying, the test strips were subjected to the tensile test according to DIN 53,455.

The films provided by the invention are distinguished by greatly reduced inflammability and low tendency to stress corrosion cracking and show, in addition to their stability to unsaturated polyester casting resins, the typical good mechanical and dielectric properties typical of polycarbonate films. They are therefore outstandingly suitable for use as electrical insulating films such as, for example, as insulation in line transformers of color television sets.

The examples which follow indicate the influence of the halogen-containing low molecular polycarbonate on the properties of polycarbonate films. The relative viscosities quoted relate to a concentration of 0.5 g of polycarbonate in 100 ml of methylene chloride and to a temperature of measurement of 25° C.

EXAMPLES 1-5

The following were used to prepare the polycarbonate films subsequently investigated:

(a) a copolycarbonate prepared by phosgenating a mixture of 97 mol % of bisphenol A and 3 mol % of 1,1-bis-(4-hydroxyphenyl)-cyclohexane, having a relative viscosity of $\eta_{rel} = 1.75$ and an average molecular weight of $\overline{M}_w$ = approx. 80,000, (b) a copolycarbonate from 97 mol % of bisphenol A and 3 mol % of 1,1-bis-(4-hydroxyphenyl)-cyclohexane, having a relative viscosity of $n_{rel} = 2.05$ and an average molecular weight of $\overline{M}_w$ = approx. 110,000, (c) an aromatic polycarbonate containing bromine, prepared by phosgenating tetrabromobisphenol A and tribromophenol as the chain stopper, and having a relative viscosity of $n_{rel} = 1.06$, an average molecular weight of $\overline{M}_n$ = approx. 8,500 and a bromine content of 58% by weight, and (d) an aromatic polycarbonate containing chlorine, prepared by phosgenating tetrachlorobisphenol A and trichlorophenol as the chain stopper, and having a relative viscosity of $n_{rel} = 1.10$, an average molecular weight of $\overline{M}_n$ = approx. 8,000 and a chlorine content of 38% by weight.

The components (a) and (b) are dissolved in methylene chloride together with the components (c) and (d) to give a 10 percent strength solution which is cast on a belt casting machine to give films.

Any other combination of low molecular weight and high molecular weight polycarbonates disclosed as suitable herein can be used to prepare films like those of the foregoing examples.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A cast polycarbonate film of low inflammability, having an oxygen index of $\geq 26\%$, measured at a layer thickness of 0.1 mm, and a total halogen content of at least about 5% by weight, and containing from about 10% to about 30% by weight of (1) a halogeno-bisphenol-polycarbonate of average molecular weight of $\overline{M}n$ between 8000 and 12,000 obtained from the halogenated bisphenols of the following formula

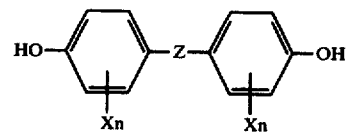

wherein X is Cl or Br, n is 1, 2, 3, or 4 and Z is C₁-C₈-alkylene, C₂-C₈-alkylidene, C₅-C₁₂-cycloalkylene, C₅-C₁₂ cycloalkylidene or the following radical

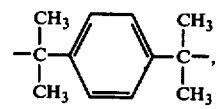

and from about 90% to about 70% by weight of (2) a polycarbonate based on bisphenols containing bisphenol A and up to 10 mol %, relative to the total bisphenol content, of other bisphenols, said polycarbonate (2) having an average molecular weight of between $\overline{M}w = 70,000$ and $\overline{M}w = 120,000$.

2. The cast film of claim 1 wherein the lower molecular halogen-containing polycarbonate is based on tetrabromobisphenol A and is of $\overline{M}_n$ between 8,000 and 12,000.

3. The cast film of claim 1 wherein the lower molecular halogen-containing polycarbonate is based on tetrachlorobisphenol A and is of $\overline{M}_n$ between 8,000 and 12,000.

4. The cast film of claim 1 wherein the high molecular aromatic polycarbonate is a copolycarbonate of from about 99 to about 90 mol % of bisphenol A and from about 1 to about 10 mol % of 1,1-bis-(4-hydroxyphenyl)-cyclohexane, having a molecular weight of $\overline{M}_w$ between about 70,000 and about 120,000.

5. The film of claim 1 wherein the high molecular polycarbonate comprises in addition to residues of bisphenol A, up to 0.5 mol % based on bisphenol A of branching residues.

6. A self supporting polycarbonate plastic film adapted for use as an electrical insulator, said film having an oxygen index of 26% or greater than 26% as determined by ASTM test method D 2863-70 and having been prepared by casting from a solution comprising a mixture of (1) from about 10% wt % to about 30 wt % of an aromatic polycarbonate containing at least 5% by weight halogen and having a number average molecular weight of from about 8,000 to about 12,000; and (2) from about 90 wt % to about 70 wt % of a polycarbonate having a weight average molecular weight of between about 70,000 and about 120,000 prepared by phosgenation of bisphenols containing at least 90 mol % bisphenol A and up to 10 mol %, based on the total bisphenol content of another bisphenol substantially free from halogen; in an organic solvent therefor.

7. A method for making an electrical insulating polycarbonate film of improved flame resistance which comprises casting a solution containing a mixture of (1) from about 10 wt % to about 30 wt % of an aromatic polycarbonate containing at least 5% by weight halogen and having a number average molecular weight of from about 8,000 to about 12,000; and (2) from about 90 wt % to about 70 wt % of a polycarbonate having a weight average molecular weight of between about 70,000 and about 120,000 prepared by phosgenation of bisphenols containing at least 90 mol % bisphenol A and up to 10 mol % based on the total bisphenol content of another bisphenol substantially free from halogen; and removing the solvent from the solution.

* * * * *